J. O. HEINZE.
TRANSMISSION MECHANISM FOR MOTOR GENERATORS.
APPLICATION FILED MAR. 22, 1915.
1,287,305.
Patented Dec. 10, 1918.
2 SHEETS—SHEET 2.
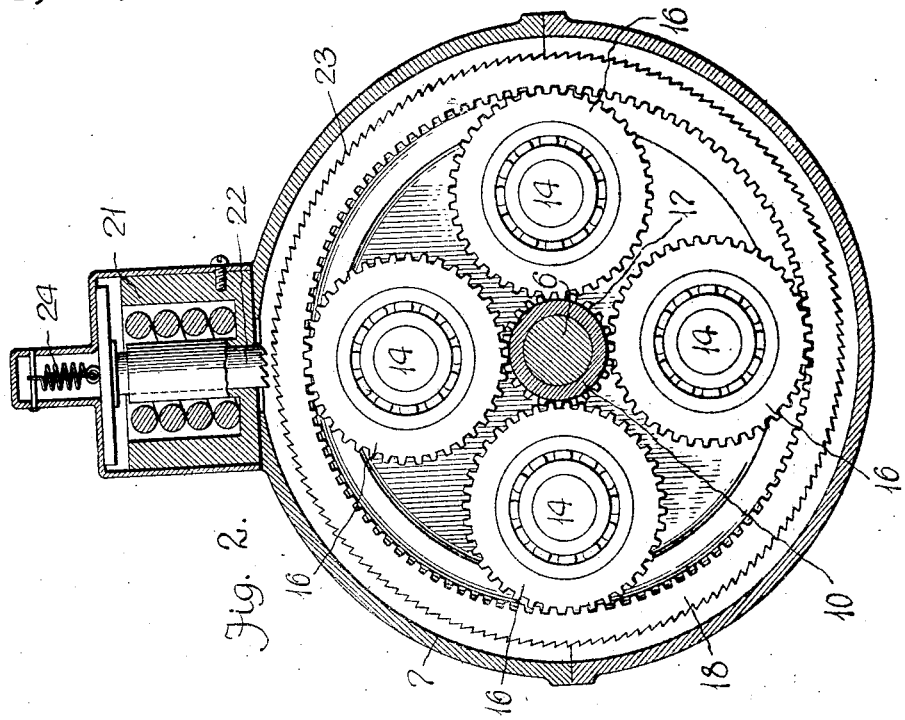
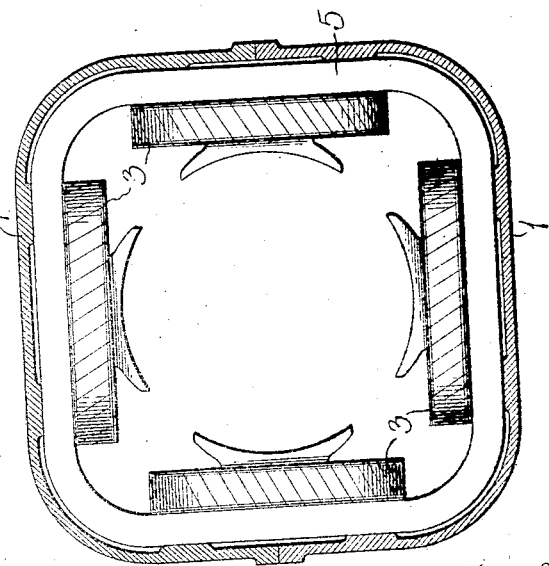
Witnesses
Chas. W. Stauffiger
Anna M Dorr
Inventor
John O. Heinze,
By
Attorney

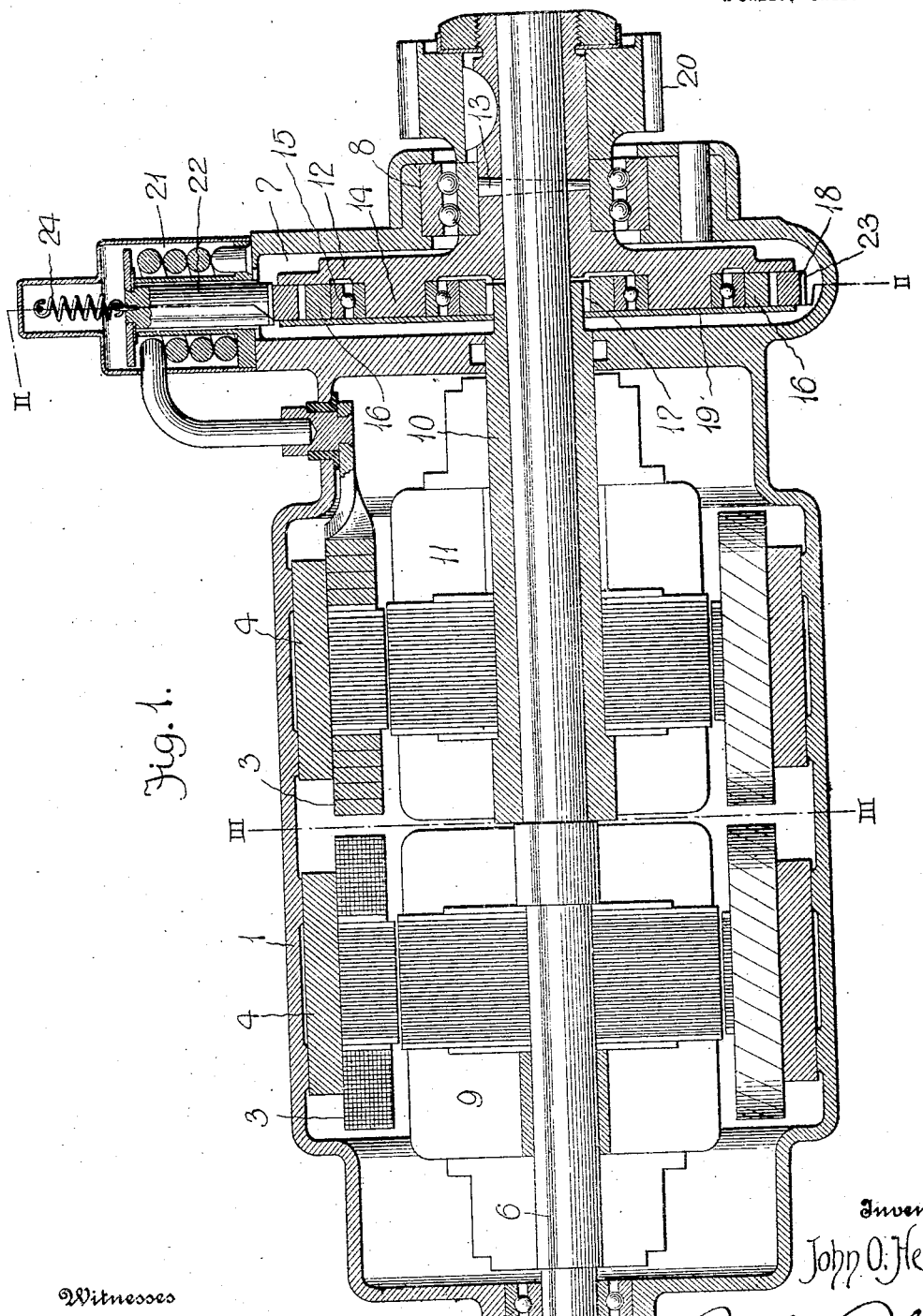

UNITED STATES PATENT OFFICE.

JOHN O. HEINZE, OF DETROIT, MICHIGAN, ASSIGNOR TO THE JOHN O. HEINZE COMPANY, OF SPRINGFIELD, OHIO, A CORPORATION OF OHIO.

TRANSMISSION MECHANISM FOR MOTOR-GENERATORS.

1,287,305.  Specification of Letters Patent.  Patented Dec. 10, 1918.

Application filed March 22, 1915. Serial No. 16,240.

*To all whom it may concern:*

Be it known that I, JOHN O. HEINZE, a citizen of the United States of America, residing at Detroit, in the county of Wayne and State of Michigan, have invented certain new and useful Improvements in Transmission Mechanism for Motor-Generators, of which the following is a specification, reference being had therein to the accompanying drawings.

This invention relates to improvements in electric starters and generators for internal combustion engines and its object is to provide a very simple and compact construction wherein a starting motor and a generator are so combined and arranged that both may be inclosed within a single casing in longitudinal alinement and power transmitted to and from the same through means so arranged that when the generator is being driven by the engine to generate current, the motor will be idle, said means being very simple in construction and requiring a minimum amount of space. A further object is to provide certain other new and useful features, as will hereinafter more fully appear and the invention consists in the providing of a tubular armature for either the motor or generator or both, through which a shaft for driving the other armature extends, and in providing other matters hereinafter set forth and more particularly pointed out in the appended claim, reference being had to the accompanying drawings in which—

Figure 1 is a longitudinal vertical section through a structure embodying the invention;

Fig. 2 is a transverse section of the same on the line II—II of Fig. 1; and

Fig. 3 is a similar section on the line III—III of Fig. 1 through the casing with the armature removed.

A casing 1 of suitable size and shape is provided to support and inclose two sets of pole pieces 2 and 3 which are secured to rings 4 fitting within the casing, and one end of said casing is provided with a bearing 5 for a shaft 6 which extends axially through the casing and through a separate chamber 7 at the opposite end thereof, the outer wall of which chamber is also provided with a suitable bearing 8 for the projecting end of the shaft. Mounted upon the shaft and preferably secured thereon in any suitable manner, is an armature 9 arranged to rotate with the shaft opposite the four pole pieces 3 carrying coils suitably wound to form a current generator. A sleeve 10 is free to rotate upon the shaft with one end adjacent the armature 9 and its opposite end projecting into the chamber through the inner wall thereof. Secured upon this sleeve is an armature 11 located opposite the four pole pieces 2 which are suitably wound to form a motor, the motor and generator being thus positioned side by side in axial alinement within the casing with their armatures supported and accurately positioned by the ends of the casing and free to rotate independently of each other.

Mounted upon the shaft 6 beyond the end of the sleeve 10, is a disk 12 having a hub portion which is secured by a pin 13 to the shaft to turn therewith in the chamber 7, and on this disk are laterally extending studs 14 carrying anti-friction bearings 15 for gears 16 which turn freely thereon, there being preferably a series of four of these gears in mesh with a single gear 17 secured upon or formed integral with the end of the sleeve 10. The gears 16 are also engaged at their outer side with an internal ring gear 18 and the gears and ring are held in place upon the disk 12 by a plate 19 or in any other suitable manner.

Motion is transmitted to or from the shaft 6 by means of a gear 20 secured upon the outer end thereof or any other suitable means may be employed for transmitting motion to or from the crank shaft of an internal combustion engine and when the shaft is being driven by the engine, it turns the generator armature 9 at a like speed, the armature 11 of the motor being free to stand still as the gears 16 are free to travel around the center gear 17 on the sleeve 10 to which said armature is secured.

When current is passed through the motor, the armature 11 will be turned and drive the center gear 17. At the same time current will pass through a suitable electromagnet 21 which is mounted upon the top of the chamber 7 and has a longitudinally movable armature 22, the lower end of which is formed with teeth to engage peripheral teeth 23 on the ring 18, the coil of said magnet being connected electrically with the field of said motor. The energizing of the magnet by the starting of the motor thus moves the armature pin or dog 22 against the action of a suitable spring 24 into engagement with the ring and locks the same against turning so that the turning of the center gear 17 will cause the series of gears 16 to travel around within the ring gear 18 and rotate the disk 12 which in turn will drive the shaft and gear 20 at a much slower speed than that of the sleeve and armature 11, greatly increasing the power of the motor by means of the reduction gears to perform the work of turning the engine over in starting. As soon as the engine starts, the current to the motor is cut off in any convenient manner, thus deënergizing the magnet to release the dog and permitting the shaft to turn independently of the sleeve and its motor armature.

This construction permits of the use of a motor and a separate generator as they are arranged end to end in longitudinal alinement so that they may be inclosed in a suitable casing of proper dimension for use in automobile constructions and motion transmitted to and from the same at either or both ends of the casing, due to the fact that the shaft extends entirely through the casing.

Obviously, other means than the planetary gear arrangement may be employed and other changes in construction and arrangement of parts may be made without departing from the spirit of the invention. I do not therefore limit myself to the particular construction shown.

Having thus fully described my invention, what I claim is:—

In an engine starter, the combination of a casing, a tubular shaft mounted in the casing, a drive shaft extending through and rotatable independently of said tubular shaft, a disk secured upon the driving shaft beyond the end of the tubular shaft, a gear on the tubular shaft, planetary gears on the disk in the plane of and in mesh with said gear, an internal gear ring in the plane of and in engagement with the planetary gears and having external teeth, and an electrically controlled dog for engaging said external teeth and holding said ring against turning, said dog extending radially in the plane of said gears.

In testimony whereof I affix my signature in presence of two witnesses.

JOHN O. HEINZE.

Witnesses:
ANNA M. DORR,
CHAS. W. STAUFFIGER.

Copies of this patent may be obtained for five cents each, by addressing the "Commissioner of Patents, Washington, D. C."